United States Patent

Morio et al.

[15] 3,699,240

[45] Oct. 17, 1972

[54] COLOR TELEVISION RECEIVER

[72] Inventors: Minoru Morio; Hiroyuki Kimura, both of Tokyo, Japan

[73] Assignee: Sony Corporation, Tokyo, Japan

[22] Filed: Nov. 19, 1970

[21] Appl. No.: 90,904

[30] Foreign Application Priority Data

Aug. 8, 1970 Japan ......................45/69489
Aug. 8, 1970 Japan ......................45/69490
Aug. 20, 1970 Japan ......................45/72936

[52] U.S. Cl. ................................................178/5.4 P
[51] Int. Cl. ................................................H04n 9/02
[58] Field of Search ........178/5.4, 5.4 P, 5.4 S, 5.4 C, 178/5.4 CD, 6.6 A

[56] References Cited

UNITED STATES PATENTS

| | | | |
|---|---|---|---|
| 3,597,530 | 8/1971 | Hartwich | 178/5.4 P |
| 3,548,091 | 12/1970 | Bockwoldt | 178/5.4 CD |
| 3,449,510 | 6/1969 | Steinkopf | 178/5.4 C |

*Primary Examiner*—Richard Murray
*Attorney*—Lewis H. Eslinger, Alvin Sinderbrand and Curtis, Morris & Safford

[57] ABSTRACT

A color television receiver utilizing the chrominance information in only alternate lines of the video signal. The signal from these alternate lines is also delayed for one scanning period, normally one line period. A switching system is provided for interlacing the delayed signals with the undelayed signals to produce a composite signal equal in duration to the signal transmitted. Since the video information on adjacent lines or scans is virtually identical, this elimination and substitution is not noticed by the viewers' eye.

22 Claims, 26 Drawing Figures

INVENTOR
HIROYUKI KIMURA
BY MINORU MORIO

Lewis H. Eslinger

FIG. 3A
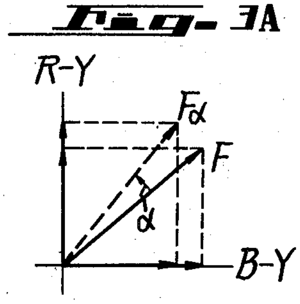
FIG. 3B
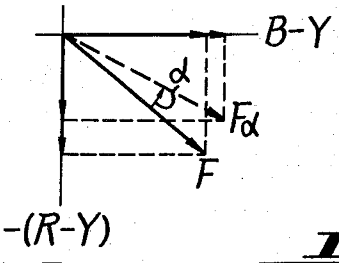
FIG. 3D
FIG. 3C
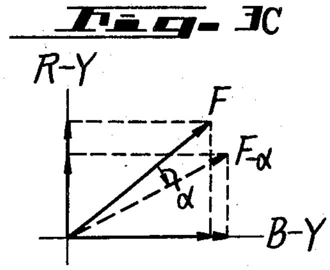
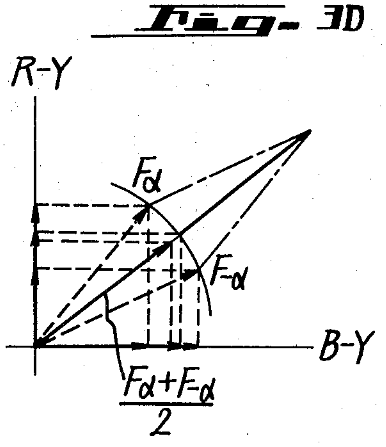
FIG. 5A
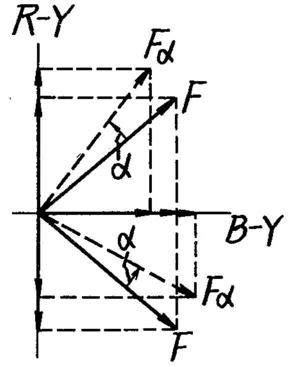
FIG. 5B
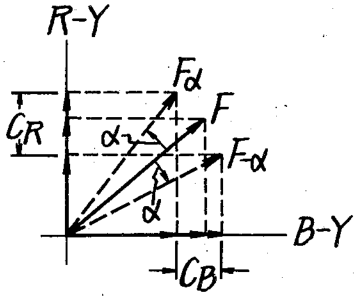
INVENTOR
HIROYUKI KIMURA
BY MINORU MORIO

INVENTOR.
HIROYUKI KIMURA
BY MINORU MORIO

INVENTOR.
HIROYUKI KIMURA
MINORU MORIO
BY

INVENTOR
HIROYUKI KIMURA
BY MINORU MORIO

INVENTOR
HIROYUKI KIMURA
BY MINORU MORIO

INVENTOR.
HIROYUKI KIMURA
MINORU MORIO
BY

INVENTOR.
HIROYUKI KIMURA
MINORU MORIO
BY

INVENTOR.
HIROYUKI KIMURA
MINORU MORIO
BY

COLOR TELEVISION RECEIVER

BACKGROUND OF THE INVENTION

The first system adopted anywhere in the world for the reception and display of color television signals was adopted with the advice and assistance of the National Television Standards Committee in the United States and is commonly referred to as the NTSC System. This system has now been widely adopted throughout the world. In the NTSC System, the chrominance signal is produced by the addition of the resultant of the suppressed carrier amplitude modulation of two quadrature components of a sub-carrier by two color difference signals. The phase of the chrominance signal represents the hue of the respective picture elements.

One of the disadvantages of the NTSC System is that it is very susceptible to chrominance phase errors. These are due to errors introduced in the transmission path and in the receiver itself. These phase errors result in considerable and undesirable errors in phase and accordingly in the hue of the reproduced picture. In television receivers adapted to receive signals transmitted in accordance with the NTSC System, the television receiver is provided with a hue control in order to adjust for the phase errors that have been introduced. The viewer adjusts the hue control based primarily on memory and thereby adjusts the phase angle of the chrominance signal.

One of the systems which has been proposed to overcome the deficiency of the NTSC System is a system which operates on a phase alternation by line system and is commonly referred to as the PAL System. In the PAL System, the phase of one of the quadrature components of the sub-carrier, namely the R—Y component, is reversed in phase by 180 degrees on consecutive line periods. In this way, the phase of the sub-carrier alternates between two values in different quadrants spaced apart by 90 degrees during consecutive line periods of the video signal. The reason for doing this is that any phase errors that are introduced also alternate between two values in consecutive line periods of the video signal. In order to eliminate this phase error, the chrominance signals in consecutive line periods are added together. In this manner amplitude error is substituted for phase error. The benefit of this is that although the eye is very susceptible to phase errors, the amplitude errors introduced cannot be detected by the eye. One of the disadvantages of the PAL System is that it has heretofore been though impossible to add to it any provision for hue control. The reason for this is that hue control entails varying the phase angle. Since, in the PAL System, any change in phase angle is compensated for, it necessarily follows that it would be impossible to make provision for hue control since any attempt to add hue control by means of varying the phase would be of no avail since the system would automatically compensate for any phase change introduced.

OBJECT OF THE INVENTION

It is accordingly an object of the present invention to provide a television receiver adapted to receive signals transmitted in accordance with the PAL System, and which includes provisions for varying the hue of the received signal.

A further object of the present invention is to provide a television receiver adapted to receive signals transmitted in accordance with the PAL System.

Yet another object of the present invention is to provide a color television receiver adapted to receive signals transmitted in accordance with the PAL System and in which the circuitry is less expensive and involves less components than is customary in receivers adapted to receive signals transmitted by the PAL System.

BRIEF DESCRIPTION OF THE INVENTION

Briefly stated, the present invention provides a color television receiver which is adapted to utilize only every other line, or scan, of the television signal. In this way only that portion of the transmitted chrominance signal is utilized which has its phase angle appearing in relatively the same position. One of the provisions of the PAL System is to change the modulation axis of one of the color dependent signals by 180° for alternate line periods of the video signal. With the present invention that portion of the video signal is eliminated which has the modulation axis appearing in different quadrants. In order to compensate for that portion of the chrominance signal that is not used a delay circuit is provided. During any particular scan or line, that line is passed through the receiver and is simultaneously delayed by a delay line for a time substantially equal to one period or one scan. During the next period or scan the received signal is not passed and the delay signal is substituted in place of the scan or line not used. Thus the resultant signal consists of an interlacing of a received line or scan and a repetition of that same line or scan which has been delayed by the delay line. The resultant signal is equal in duration to the signal that was received. Since the video information on adjacent lines or scans is virtually identical, this interlacing is not noticed by the eye of the viewer. The resultant signal is then demodulated by a pair of demodulators. These demodulators have connected to them an oscillator which should have the same frequency as the burst signal of the video signal. In the case of the NSTC System this burst frequency is 3.58 megacycles whereas in the case of the usual PAL System the burst frequency is approximately 4.5 megacycles. Accordingly, in order to make the receiver of the present system adaptable to receive signals transmitted in accordance with both systems it is necessary that either the NTSC System adopt a burst frequency of 4.5 megacycles or that the PAL System adopt a burst frequency of 3.58 megacycles.

BRIEF DESCRIPTION OF THE DRAWINGS

FIGS. 3A–3D is a series of vector diagrams illustrating the demodulating system shown in FIG. 2;

FIGS. 5A and 5B shows vector diagrams for explaining the demodulating system depicted in FIG. 4;

PRIOR ART

In accordance with the PAL color television system a chrominance signal is formed by modulation of a color sub-carrier modulated by two color signals, that is, usually by the blue and red color difference signals $E_B'-E_Y'$ and $E_R'-E_Y'$ at the same time. In this case, the modulation axis of the color sub-carrier component for the red color difference signal is reversed alternately to a reference phase $$—\varphi_0—$$

and a phase $$—\varphi_{-0}—$$

displaced 180 degrees apart therefrom at every horizontal scanning, while the modulation axis of the color sub-carrier component from the blue color difference signal has a phase $$—\varphi_0-\frac{\pi}{2}—$$

displaced 90 degrees apart from the reference phase $$—\varphi_0—.$$

Figure 1:
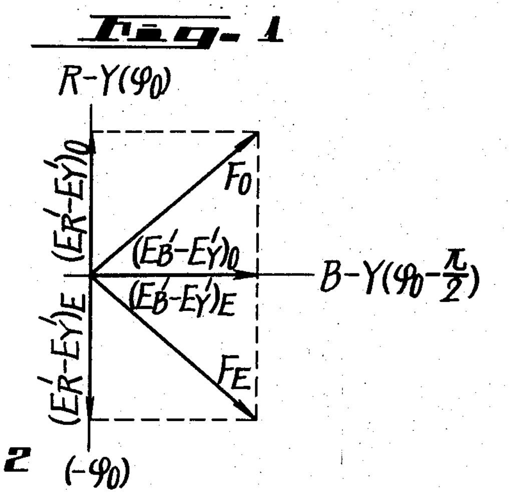
FIG. 1 is a vector diagram illustrating a color television signal transmitted in accordance with the PAL System.

The chrominance signal is indicated by the equation $F_O = (E_B' - E_Y')_0 + j(E_R' - E_Y')_0$, for example, on odd number scanning lines and by $F_E = (E_B' - E_Y')_E - j(E_R' - E_Y')_E$ on even number scanning lines as illustrated by FIG. 1.

Figure 2:
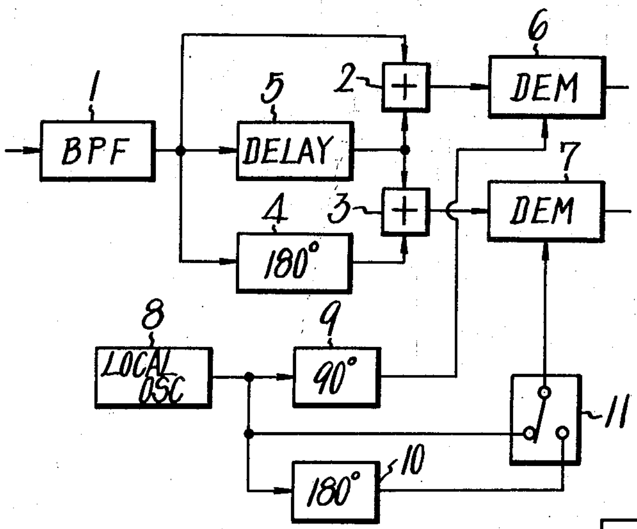
FIG. 2 is a block diagram showing one example of a conventional system for demodulating the color television signal transmitted in accordance with the PAL System.

For demodulating such a color television signal, there has heretofore been proposed a system such as shown in FIG. 2 which is commonly referred to as a standard PAL System. With this standard system, the aforementioned chrominance signal derived from a bandpass filter 1 is supplied directly to one adder circuit 2 and to the other adder circuit 3 through a phase inverter circuit 4. The chrominance signal is also supplied to both adder circuits 2 and 3 through a delay circuit 5 by means of which the chrominance signal is delayed by one horizontal scanning period. Accordingly, chrominance signals at successive horizontal scanning lines $L_n, L_{n+1}, L_{n+2}, L_{n+3}, \ldots$ have the following relationship:

$$F_n = (E_B' - E_Y')_n + j(E_R' - E_Y')_n$$

$$F_{n+1} = (E_B' - E_Y')_{n+1} - j(E_R' - E_Y')_{n+1}$$

$$F_{n+2} = (E_B' - E_Y')_{n+2} + j(E_R' - E_Y')_{n+2}$$

$$F_{n+3} = (E_B' - E_Y')_{n+3} - j(E_R' - E_Y')_{n+3}$$

Therefore, in the horizontal scanning of the line $L_{n-1}$ the adder circuit 2 achieves the operation $$\frac{F_n+F_{n+1}}{2}$$

and the other adder circuit 3 achieves the operation $$\frac{F_n-F_{n+1}}{2}.$$

Consequently, the color signals of adjacent horizontal scanning lines are substantially equal to each other, so that the signals $(E_B' - E_Y')n+1$ and $j(E_R' - E_Y')_{n-1}$ are respectively derived from the adder circuits 2 and 3. In the scanning period of the subsequent horizontal scanning the $L_{n-2}$ the adder circuits 2 and 3 respectively achieve similar operations, i.e., $$\frac{F_{n+1}+F_{n+2}}{2} \text{ and } \frac{F_{n+1}-F_{n+2}}{2}$$

and the signals $(E_B' - E_Y')_{n+2}$ and $j(E_R' - E_Y')_{n+2}$ are derived from the adder circuits 2 and 3. Thus, the chrominance signal corresponding to the red color difference signal is derived from the adder circuit 3 while being reversed in phase at every horizontal scanning. The signals derived from the adder circuits 2 and 3 are respectively supplied to the demodulators 6 and 7 independently of each other. A reference sub-carrier signal derived from a local oscillator 8 is applied to the demodulator 6 in the form of a signal having a phase $$—\varphi_0-\frac{\pi}{2}—$$

after being shifted 90° by the phase shifter 9 and, at the same time, the sub-carrier signal is applied directly to a switching circuit 11 and is also supplied to the switching circuit 11 through a 180° phase shifter 10 and is thus phase reversed. These two signals that are applied to the switching circuit 11 are alternately supplied to the demodulator 7 while being changed at every horizontal scanning period. As a result of this, color difference signals $E_B' - E_Y'$ and $E_R' - E_Y'$ of the same polarity are respectively derived from the demodulators 6 and 7.

This conventional system eliminates phase distortion or phase error in the chrominance signals. When a phase distortion $\alpha$ is introduced in an original signal F on the odd number horizontal scanning line in the direction as shown in FIG. 3A and the original signal F is thereby shifted as indicated by $F\alpha$ in the figure, the original signal F on the even number field is also shifted by a similar phase distortion $\alpha$ as indicated by $F\alpha$ in FIG. 3B. However, the demodulating axis on the even number line for the red color difference signal is opposite to that on the odd number line as above described, so that in the demodulated output the phase distortion $\alpha$ on the even number line is equal in value but opposite in sense to that on the odd number line and the signal on the even number line is shifted as indicated by F-$\alpha$ in FIG. 3C. Then, the signals on both the odd and even number horizontal scanning lines are added to each other as previously described, namely an adding operation $$\frac{F\alpha + F\alpha}{2}$$

is achieved and the resulting signal thus demodulated is in phase with the original signal F and the phase distortions are thus cancelled as will be seen from FIG. 3D. However, the signal $$\frac{F\alpha + F-\alpha}{2}$$

is a little smaller than the original signal F as will be apparent from FIG. 3D and this causes a little distortion in the saturation of each color signal.

Thus, the standard PAL System is advantageous in the elimination of phase distortions, but defective in requiring extremely complicated construction.

Figure 4:
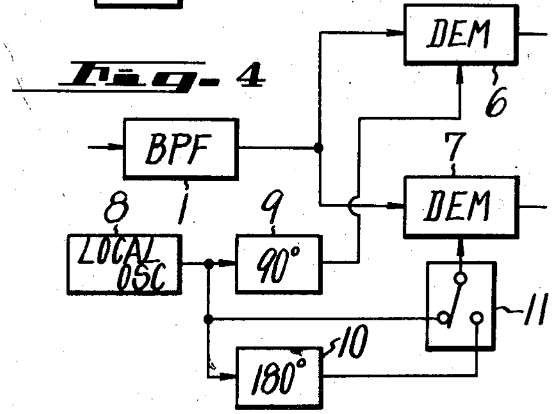
FIG. 4 is a block diagram illustrating another example of a conventional PAL system color television signal demodulating system.

Another demodulation system, commonly referred to as a simple PAL System, has been proposed which is shown in FIG. 4. With this system, a chrominance signal separated by a bandpass filter 1 is supplied directly to demodulators 6 and 7 and demodulation is carried out by the demodulators 6 and 7 in the same manner as in the case of the aforementioned standard system. Accordingly, in this case blue and red color difference signals $(E_B' - E_Y')_n$ and $(E_R' - E_Y')_n$ are respectively demodulated from the signal $F_n$ by the demodulators 6 and 7. On the subsequent horizontal scanning line signals $(E_B' - E_Y')_{n+1}$ and $(E_R' - E_Y')_{n+1}$ are respectively demodulated by the demodulators 6 and 7 from the signal $F_{n+1}$ in a similar manner. Thus, demodulation is sequentially carried out.

This simple PAL System is advantageous in that it has extremely simple construction, as compared with the aforementioned standard system, but has a fatal drawback such that phase distortion leads to so-called venetian blind effect in the reproduced picture. Namely, when the phase distortions $\alpha$ occur in the signals on the odd and even number horizontal scanning lines as shown in FIG. 5A, the phase distortions on the respective lines in the demodulated output are equal in value but opposite in direction to each other as depicted in FIG. 5B. The color difference signals are sequentially demodulated from the signals F$\alpha$ and F-$\alpha$, so that the red and blue color difference signals are greatly different in saturation on the odd and even number horizontal scanning lines due to the phase distortions as indicated by $C_R$ and $C_B$ respectively, causing deterioration of the reproduced picture commonly referred to as a venetian blind effect.

DESCRIPTION OF THE INVENTION

The present invention provides a color television receiver having a novel demodulating system which is used for the reception of chrominance signals transmitted, particularly, in accordance with the system of Phase Alternation by Line (PAL) and also can be used for the chrominance signals transmitted in accordance with other systems, for example, the NTSC System.

When receiving color television signals transmitted in accordance with the PAL system, the demodulating system according to the present invention is far simpler in construction than the standard PAL System previously known and free from deteriorations in the quality of the reproduced picture encountered in the simple PAL System. The receiver is such that the demodulating axis of the chrominance signals is always fixed.

A description will be given first of the fundamental concept of the demodulating system of this invention where it is used for the reception of signals transmitted in accordance with the PAL television signal. In the present invention the modulated chrominance signal formed by modulation of a color subcarrier signal by two color signals (usually color difference signals) is separated from the composite PAL color television signal, and this separated original chrominance signal and a signal produced by delaying the separated original chrominance signal by one horizontal scanning period (line period) or an odd number of time as long as the horizontal scanning period, are alternately extracted at every horizontal scanning period. As a result of this, a chrominance signal in which both modulating axes of two color signals (color difference signals) are held in fixed phase respectively is extracted from the separated chrominance signal in which one of the modulating axes is reversed in phase at every horizontal scanning period. The extracted chrominance signal is supplied to color demodulating means to derive therefrom a continuous demodulated color difference signal.

Figure 6:
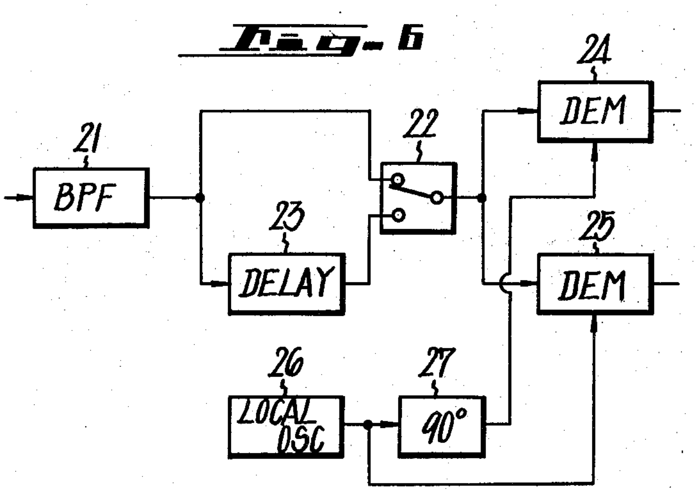
FIG. 6 is a block diagram illustrating one example of the principal part of a demodulator circuit of this invention.

FIG. 6 illustrates one example of the demodulator circuit of this invention in which the chrominance signal is separated by a bandpass filter 21 from the composite color television signal and is supplied directly to one input terminal of a switching circuit 22 and to the other input terminal of the switching circuit 22 through a delay circuit 23 by means of which the chrominance signal is delayed by one horizontal scanning period or one line period, and the switching circuit 22 is changed over at every horizontal scanning to supply its output to demodulators 24 and 25. A reference sub-carrier signal of a phase $$\varphi_0$$

from a local oscillator 26 is supplied to the demodulator 25 and, at the same time, the reference sub-carrier signal is applied to the other demodulator 24 after being phase shifted 90 degrees by phase shifter 27 to have a phase $$\varphi_0 - \frac{\pi}{2}.$$

Figure 7A:
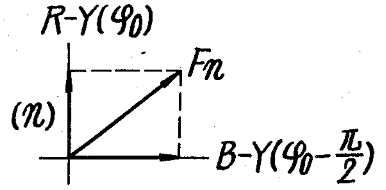
FIGS. 7A–7E is a series of vector diagrams of explaining the demodulator circuit shown in FIG. 6.
Figure 7B:
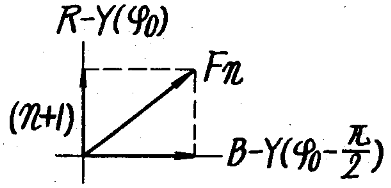
Figure 7C:
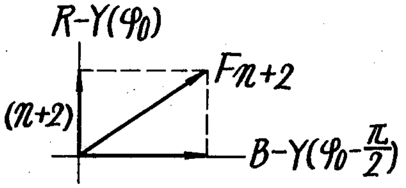
Figure 7D:
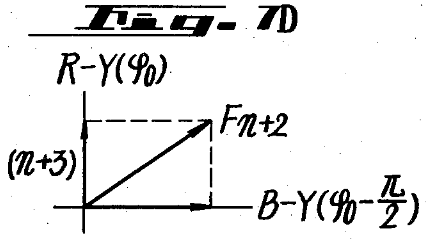
Figure 7E:
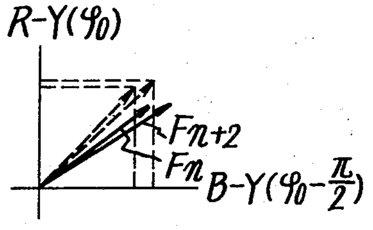

Accordingly, at the arrival of the signal of the horizontal scanning line $L_n$ the switching circuit 22 is held in the condition depicted in FIG. 6 and a signal $F_n$ is applied to the demodulators 24 and 25 as illustrated in FIG. 7A, thus providing demodulated outputs $(E_B' - E_Y')_n$ and $(E_R' - E_Y')_n$. At the arrival of the signal of the subsequent horizontal scanning line $L_{n-1}$, the switching circuit 22 is held in the condition opposite to that shown in the figure, so that the signal $F_{n+1}$ produced at this time is not applied to the demodulators 24 and 25 but instead the signal $F_n$ delayed by one horizontal scanning period by the delay circuit 23 is applied through the switching circuit 22 to the demodulators 24 and 25 to derive therefrom demodulated outputs $(E_B' - E_Y')_n$ and $(E_R' - E_Y')_n$ respectively, as shown in FIG. 7B. At the arrival of the signal of the next line $L_{n+2}$, a signal $F_{n+2}$ produced at this time is supplied to the demodulators 24 and 25 as depicted in FIG. 7C, thus providing demodulated outputs $(E_B' - E_Y')_{n+2}$ and $(E_R' - E_Y')_{n+2}$ respectively. Further, at the arrival of the signal of the next line $L_{n+3}$, the signal $F_{n+2}$ is also applied to the demodulators 24 and 25 to derive therefrom the same demodulated outputs as depicted in FIG. 7D. Accordingly, although the phase of the modulating axis of the color sub-carrier component modulated by the red color difference signal is reversed to $$-\varphi_0- \text{ and } -\varphi_0-$$

alternately at every horizontal scanning, only the chrominance signal in which the phase of the modulating axis of the color sub-carrier component for the red color difference signal is $$-\varphi_0-$$

is continuously picked up and demodulated.

This invention uses such a demodulation system and, in order that the switching circuit 22 may always be held in a correct condition to ensure the provision of a demodulated output as above described, the phase of a burst signal in the carrier color signal is detected and the above-described extracting operation, namely the change-over operation of the switching circuit 22 is controlled by the detected output.

Referring now to FIGS. 8 to 12, one example of the demodulator circuit of this invention will hereinafter be described in detail. In the present example the phase of the burst signal contained in the chrominance signal is compared with that of a burst signal picked up by the switching circuit 22 and the change over of the switching circuit 22 is controlled by the phase compared output.

Figure 8:
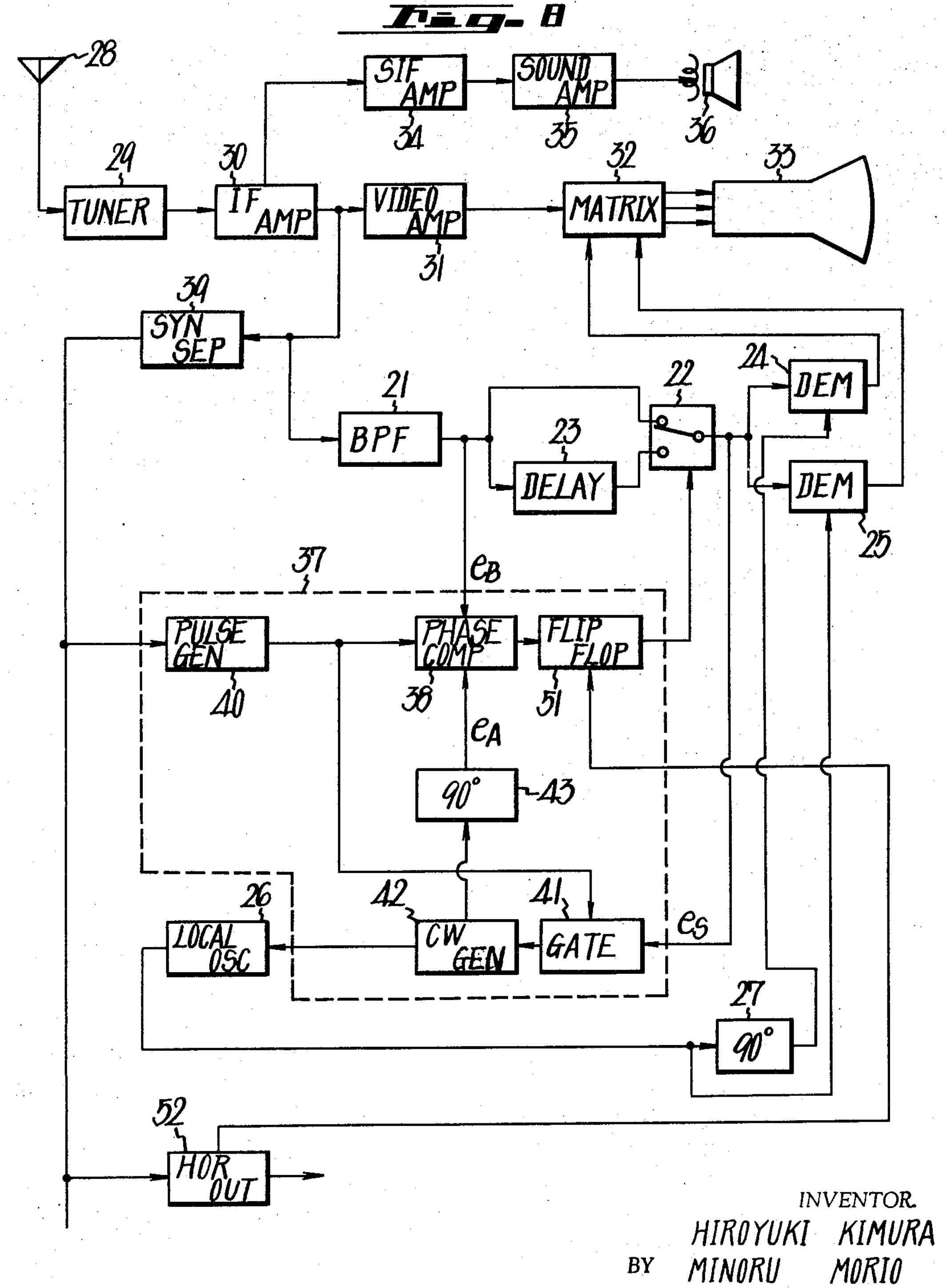
FIG. 8 is a block diagram showing one example of the demodulator circuit of this invention.

In FIG. 8 reference numeral 28 indicates an antenna, 29 a tuner, 30 a video intermediate frequency amplifier and detector circuit, 31 a video amplifier circuit, 32 a matrix circuit, 33 a color picture tube, 34 an audio intermediate frequency amplifier circuit, 35 an audio amplifier circuit and 36 a speaker. The chrominance signal is separated by a bandpass filter 21 and is demodulated as above described and the demodulated outputs of the demodulators 24 and 25 are supplied to the matrix circuit 32 together with a luminance signal derived from the video amplifier circuit 31 and red, green and blue color signals derived from the matrix circuit 32 are supplied to the picture tube 33.

One portion of the chrominance signal separated by the filter 21 is applied to a phase comparator circuit 38 of a control section 37. While one portion of the output of the video intermediate frequency amplifier and detector circuit 30 is supplied to a synchronizing signal separator circuit 39 and the horizontal synchronizing signal thereby separated is fed to a gate pulse generator circuit 40 to derive therefrom a gate pulse which remains in the on state for the duration of the burst signal following the horizontal synchronizing signal and the gate pulse is applied to the phase comparator circuit 38. A signal derived from the switching circuit 22 is fed to a gate circuit 41 in which the burst signal is extracted by the gate pulse supplied from the gate pulse generator circuit 40 and the extracted burst signal is applied to a continuous wave generator circuit 42 to derive therefrom a continuous wave signal which is of the same frequency and phase as those of the burst signal and the resulting continuous wave signal is supplied to the phase comparator circuit 38 through a 90 degree phase shifter 43. Thus, in the phase comparator circuit 38 the burst signal in the chrominance signal from the filter 21 is compared in phase with the continuous wave signal from the phase shifter 43.

Figure 9:
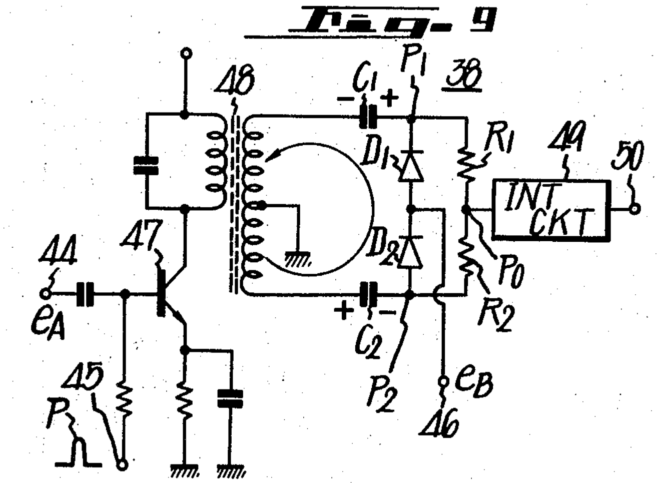
FIG. 9 is a connection diagram illustrating one example of a phase comparator circuit employed in the demodulator circuit of this invention.
Figure 10:
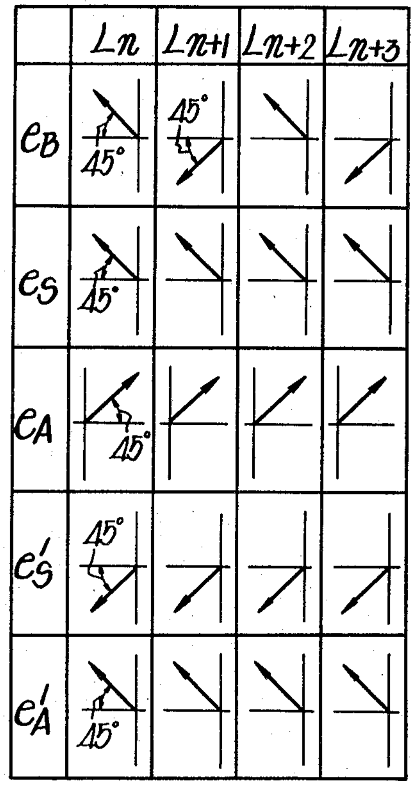
FIG. 10 is a vector diagram for explaining the operation of the demodulator circuit shown in FIG. 8.
Figure 11A:
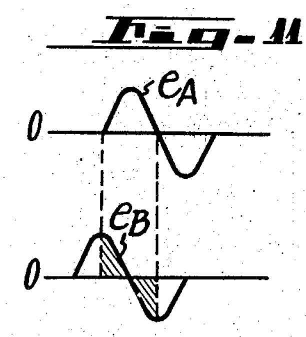
FIGS. 11A–11B and 12A–12B are waveform diagrams for explaining the operation of the phase comparator circuit shown in FIG. 9.

This phase comparison is achieved in the manner depicted in FIGS. 9 to 11. Namely, FIG. 9 shows one example of the phase comparator circuit 38, in which terminals 44, 45 and 46 are respectively supplied with a continuous wave signal $e_A$ from the phase shifter 43, a gate pulse P from the gate pulse generator circuit 40 and a burst signal $e_B$ from the filter 21. The phase of the burst signal $e_B$ derived from the filter 21 is delayed behind the axis —(B — Y) by 45 degrees on the odd number horizontal scanning lines $L_n$, $L_{n+2}$, . . . . and advanced from the axis —(B—Y) by 45 degrees on the even number horizontal scanning lines $L_{n+1}$, $L_{n+3}$, . . . . as illustrated in FIG. 10. The signal extracted by the switching circuit 22 consists of the original chrominance signal of alternate horizontal scanning lines and the signal delayed by one horizontal scanning period as previously described, so that the phase of the burst signal $e_S$ contained in the extracted signal is always constant, and in the case of extracting the original chrominance signal on the odd number horizontal scanning line only as shown in FIG. 7, the phase of the burst signal $e_S$ is always delayed behind the axis —(B—Y) by 45 degrees as depicted in FIG. 10. Further, since the continuous wave signal of the same phase as the burst signal $e_S$ is delayed 90 degrees by the phase shifter 43, the continuous wave signal $e_A$ derived from the phase shifter 43 is always advanced from the axis B—Y by 45 degrees as shown in FIG. 10.

Figure 11B:
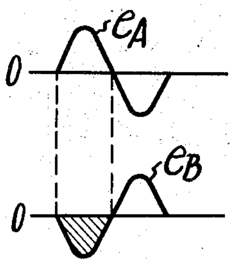

When the gate pulse P is supplied to the terminal 45 the continuous wave signal $e_A$ is applied to a transformer 48 through a transistor 47, so that the continuous wave signal $e_A$ produced across the secondary coil of the transformer 48 is rectified by diodes $D_1$ and $D_2$ at every positive half cycle of the signal $e_A$. As a result of this, a charging current flows in capacitors $C_1$ and $C_2$ as indicated by the arrow and DC potentials at points $P_1$ and $P_2$ become equal to each other but reverse in polarity to reduce to zero the DC potential at the connection point $P_0$ of the resistors $R_1$ and $R_2$. Since the diodes $D_1$ and $D_2$ conduct only in the positive half cycle of the signal $e_A$, the signal $E_B$ from the terminal 46 is fed to the point $P_0$ through the diodes $D_1$ and $D_2$ while the diodes are in the on state. Accordingly, in the event that the switching circuit 22 is held in its correct changed over condition the phase of the continuous wave signal $e_A$ is always advanced 45 degrees relative to the axis B — Y as previously described and the signal $e_B$ of each of the odd number horizontal scanning lines $L_n$, $L_{n+2}$,.... is advanced 90 degrees relative to the signal $e_A$, so that the portion of the signal $e_B$ from its positive to negative peak appears at the point $P_0$ as shown in FIG. 11 A and is integrated by an integrator circuit 49, reducing its output to zero at its output terminal 50. Further, the signal $e_B$ of each of the even number horizontal scanning lines $L_{n+1}$, $L_{n+3}$, . . . . is advanced 180 degrees relative to the signal $e_A$, so that the negative half cycle of the signal $e_B$ appears at the point $P_0$ as depicted in FIG. 11B and the integrated output derived at the output terminal 50 is made negative. That is, when the switching circuit 22 is in its correct changed-over condition, negative or zero output is derived at the output terminal 50.

Figure 12A:
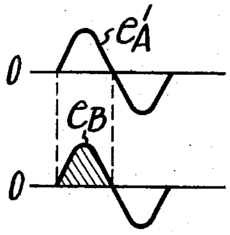
Figure 12B:
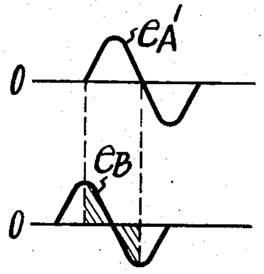

When the switching operation of the switching circuit 22 has been reversed in phase, the original chrominance signal of the even-number horizontal scanning lines of the transmitted signal is extracted and the phase of the burst signal contained in the extracted signal is always advanced 45 degrees relative to the axis —(B — Y) as indicated by $e_S'$ in FIG. 10. Accordingly, the phase of the continuous wave signal derived from the phase shifter 43 is always delayed 45 degrees relative to the axis B — Y as indicated by $e_A'$ in FIG. 10. Consequently, in the case of the odd-number horizontal scanning lines $L_n$, $L_{n+2}$, . . . . , the phase of the signal $e_B$ coincides with that of the signal $e_A'$ and the positive half cycle of the signal $e_B$ appears at the point $P_0$ as shown in FIG. 12A. In the case of the even-number horizontal scanning lines $L_{n+1}$ , $L_{n+3}$, ...., the signal $e_B$ is advanced 90 degrees relative to the signal $e_A'$ and the portion of the signal $e_B$ from its to negative peak appears at the point $P_0$ as shown in FIG. 12B. Thus, the integrated output derived at the output terminal 50 is positive or zero in this case.

A flip-flop circuit 51 for changing over the switching circuit 22 is controlled by the output derived at the terminal 50 to thereby hold the switching circuit in its correct change-over condition. Namely, the flip-flop circuit 51 is triggered by a horizontal pulse derived from a horizontal deflection circuit 52 to be reversed at every horizontal scanning and its output is applied as a switching signal to the switching circuit 22 to change it over at every horizontal scanning as previously described. When the change-over of the switching circuit 22 is achieved correctly, the output derived at the output terminal 50 of the phase comparator circuit 38 is negative or zero as above described. In this manner the flip-flop circuit 51 is not actuated by the above output and the switching circuit 22 is held in the correct changed-over condition. When the phase of the switching signal from the flip-flop circuit 51 is reversed by some cause to alter the switching circuit 22 to its incorrect changed-over condition, the output derived at the output terminal 50 of the phase comparator circuit 38 is positive or zero as previously described, so that by reversing the phase of the output of the flip-flop circuit 51 with the output of the phase comparator circuit 38, the switching circuit 22 is altered to its correct changed-over condition.

The output derived from the continuous wave generator circuit 42 drives the local oscillator 26 from which a reference subcarrier for the demodulation previously described is derived.

Figure 13:
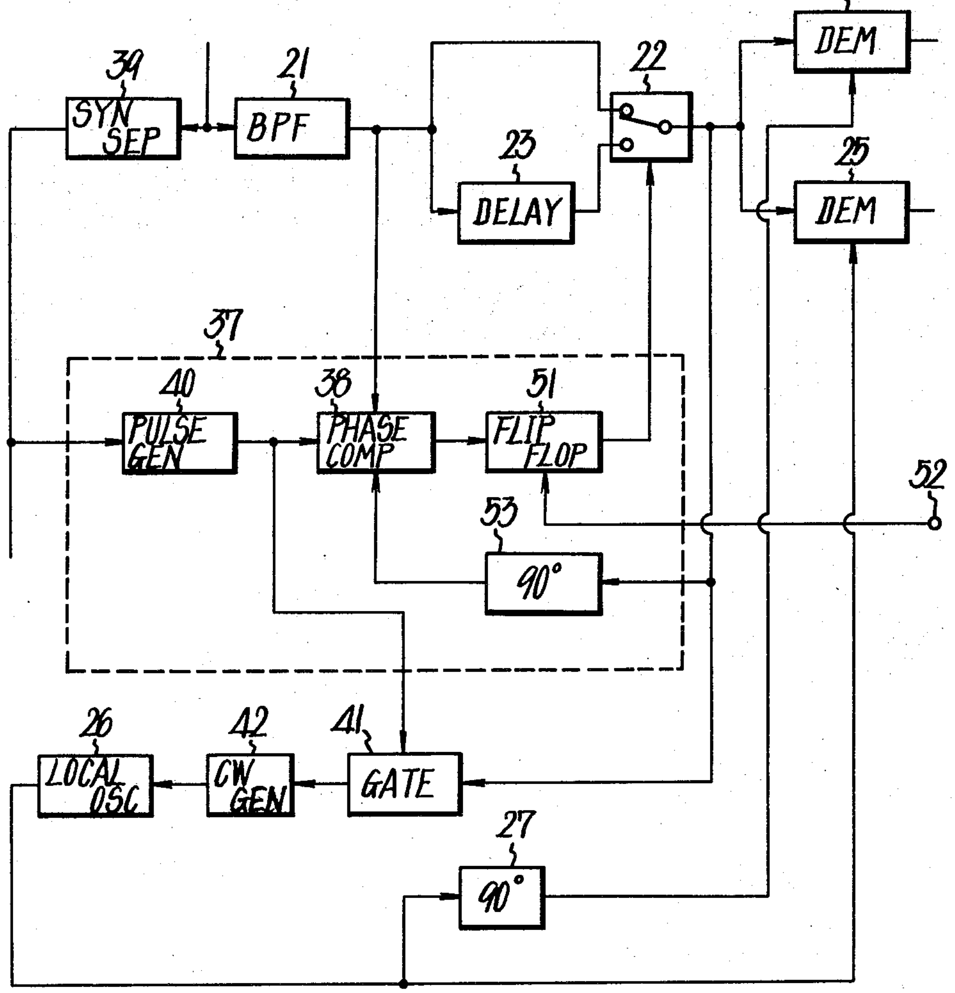
FIGS. 13 to 16 are block diagrams illustrating modified forms of the demodulator circuit of this invention.
Figure 14:
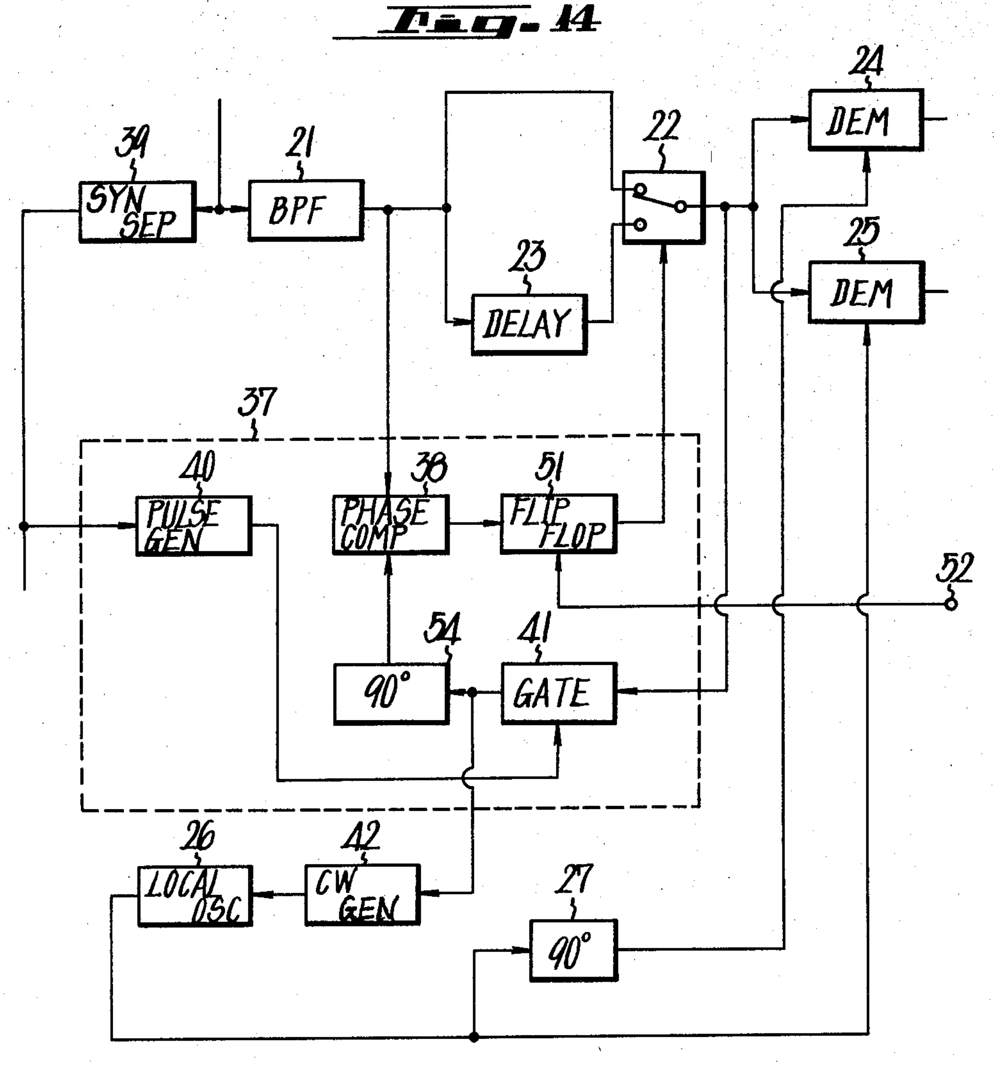

In the example of FIG. 8 the burst signal is picked up from the signal switchingly extracted by the switching circuit 22 and is rendered into a continuous wave and delayed by 90 degrees, thereafter being applied as one input to the phase comparator circuit 38. However, it is also possible to apply the extracted signal to the phase comparator circuit 38 through the 90° phase shifter 53 as depicted in FIG. 13. Further, the gate pulse from the gate pulse generator circuit 40 need not always be supplied to the phase comparator circuit 38 and the burst signal contained in the extracted signal derived from the gate circuit 41 may be supplied to the phase comparator circuit 38 through 90° phase shifter 54 without being rendered into a continuous wave, as depicted in FIG. 14. Namely, in these cases the burst signals of the original chrominance signal and the extracted signal are compared in phase with each other.

Figure 15:
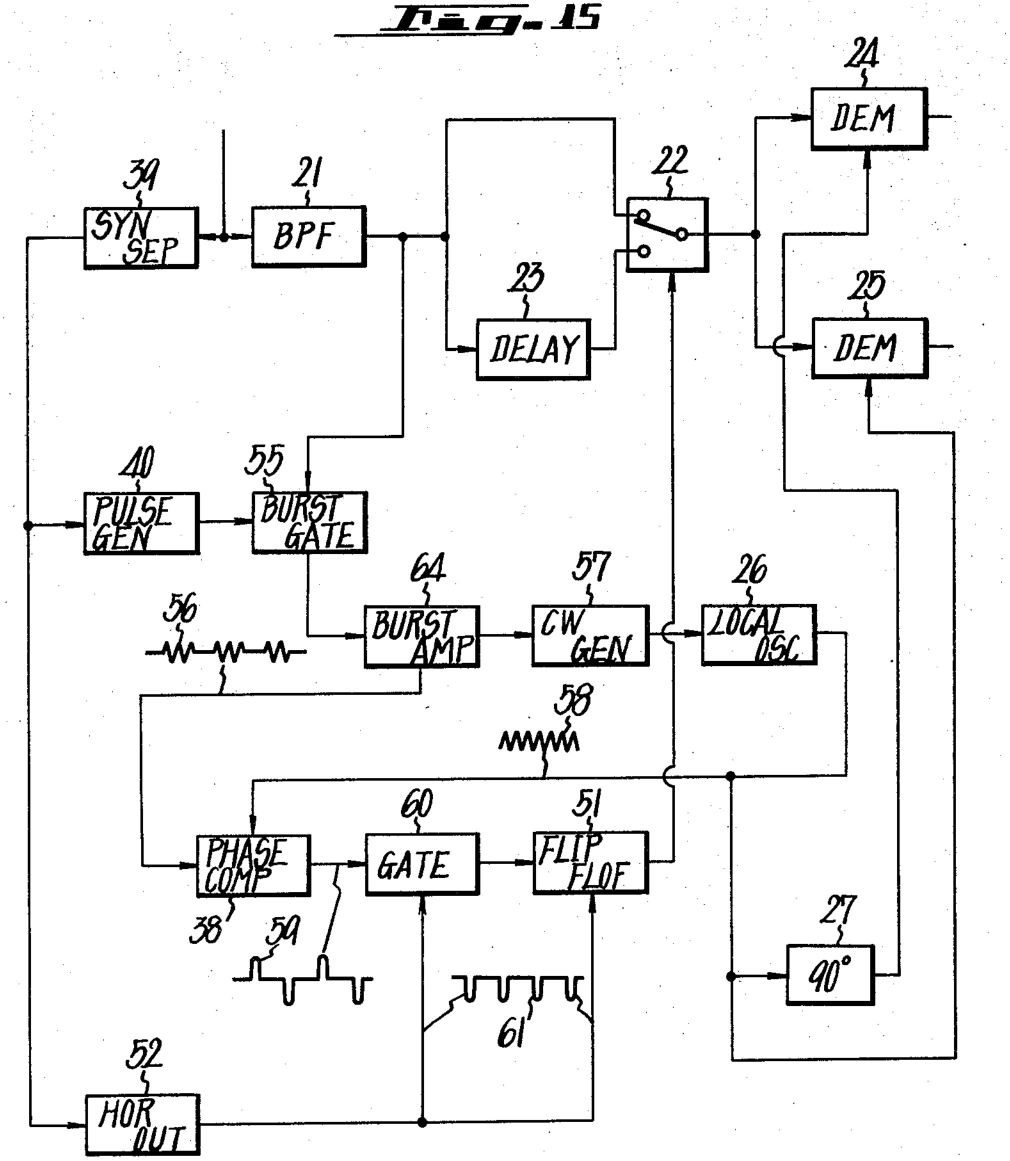

In the example shown in FIG. 15 the phase of the burst signal contained in the original chrominance signal operated by the filter 21 is not compared with that of the burst signal switchingly extracted by the switching circuit 22 but instead the phase of the burst signal in the separated original chrominance signal is compared with that of the reference subcarrier derived from the local oscillator. That is, the chrominance signal derived from the filter 21 is fed to a burst gate circuit 55, in which a burst signal 56 in the chrominance signal is picked up by the gate pulse derived from the gate pulse generator circuit 40 and the burst signal 56 is supplied to the phase comparator circuit 38 through a burst amplifier 64. The burst signal 56 is applied from the burst amplifier 64 to a continuous wave generator circuit 57 and is thereby rendered into a continuous wave, which is applied to the local oscillator 26 to derive therefrom a subcarrier signal 58 of the reference phase. The subcarrier signal 58 of the reference phase is fed to the phase comparator circuit 38, in which the burst signal 56 is compared in phase with the subcarrier signal 58 of the reference phase. The phase comparator circuit 38 produces a phase compared output which differs in polarity on the odd and even number horizontal scanning lines in such a manner that a positive pulse is provided at the arrival of the signal of the odd-number horizontal scanning line because the phase of the burst signal contained therein is delayed 45 degrees relative to the axis —(B — Y). The negative pulse produced at the arrival of the signal of the even-number horizontal scanning line because the phase of the burst signal therein is advanced 45 degrees relative to the axis —(B — Y). The output 59 of the phase comparator circuit 38 is supplied to a gate circuit 60 and is added to a horizontal pulse 61 applied from a horizontal deflection circuit 52 to derive therefrom a negative pulse at the arrival of the signal of the even-number horizontal scanning period. The flip-flop circuit 51 is controlled by the negative pulse in such a manner that the switching circuit 22 is changed over to the condition shown in the figure at the arrival of the signal of the odd-number horizontal scanning line and reversed at the arrival of the signal of the even numbered horizontal scanning line. As a result of this, there is always derived from the switching circuit 22 a signal of the odd-number horizontal scanning line and the signal delayed behind it by one horizontal scanning period.

Further, instead of the burst signal contained in the original chrominance signal, the burst signal in the signal derived from the switching circuit 22 or the signal from the delay circuit 23 may also be compared in phase with the reference subcarrier. In short, any signal can be used, so long as it is obtained at a stage prior to the demodulators 24 and 25.

The flip-flop circuit 51 need not always be driven with the horizontal pulse but may be driven with the horizontal synchronizing signal itself.

Figure 16:
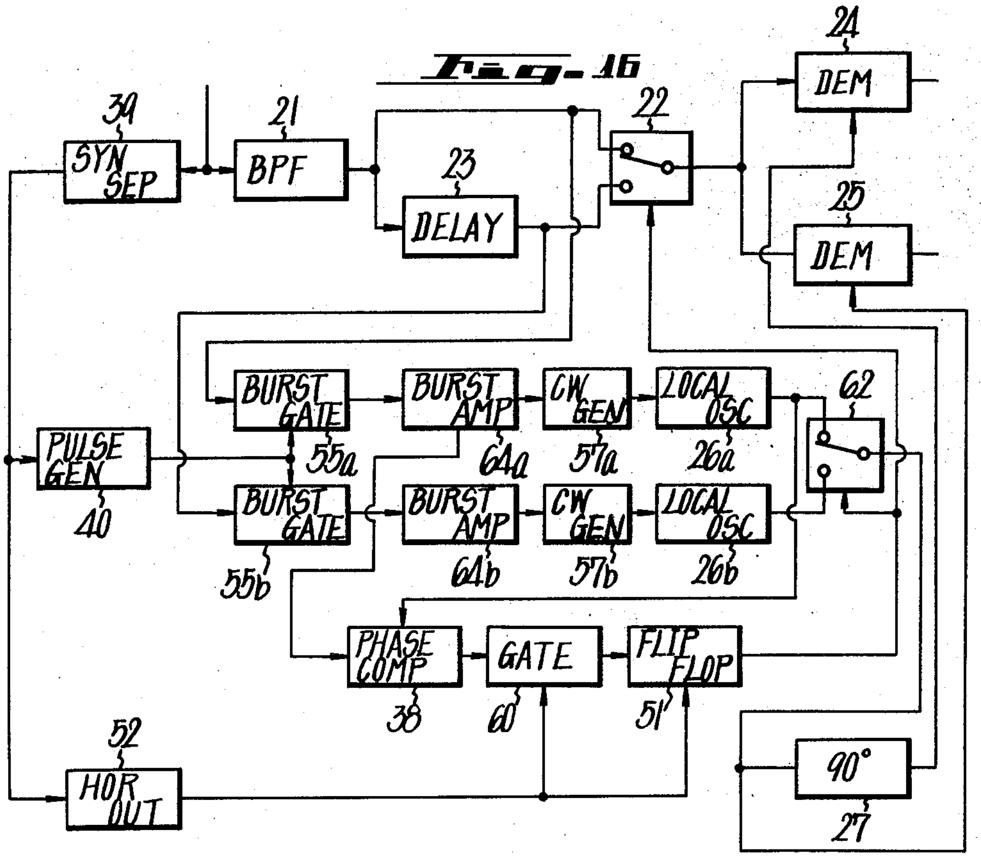

Further in the example shown in FIG. 16 two local oscillators for producing the reference subcarrier signal are provided. These two oscillators are supplied in order to be locked to the phase of their oscillations with the burst signals in the separated original chrominance signal and in the delayed chrominance signal respectively.

Both outputs of these oscillators are switchingly extracted for alternate horizontal scanning periods in correspondence with switching of the chrominance signal by the switch circuit extracting the chrominance signal and applied to the demodulators for demodulating two color differential signals. As a result, at the alternate horizontal scanning periods in which the original chrominance signal extracted by the switch circuit is supplied to the demodulators, the demodulators are supplied with the reference subcarrier signal produced by the first local oscillator in which the phase of oscillation is locked by the burst signal in the original chrominance signal, and at other alternate horizontal scanning periods in which the delayed chrominance signal extracted by the switch circuit is supplied to the demodulators, the demodulators are supplied with the reference subcarrier signal produced by the second local oscillator in which the phase of oscillation is locked by the burst signal in the delayed chrominance signal.

That is, the original chrominance signal derived from the filter 21 is fed to a first burst gate circuit 55*a*, in which the burst signal in the original chrominance signal is extracted by the gate pulse derived from the gate pulse generator circuit 40 and the burst signal in the original chrominance signal is supplied to a first continuous wave generator 57*a* through a first burst amplifier 64*a*, then finally applied to a first local oscillator 26*a* to lock the phase of the reference subcarrier signal generated thereby. While the delayed chrominance signal from the delay circuit 23 is fed to a second burst gate circuit 55*b*, in which the burst signal in the delayed chrominance signal is extracted by the gate pulse derived from the gate pulse generator circuit 40 and the burst signal in the delayed chrominance signal is supplied to a second continuous wave generator 57b through a second burst amplifier 64*b*, then finally applied to a second local oscillator 26*b* to lock the phase of the reference subcarrier signal generated therefrom. The burst signal in the original chrominance signal is also supplied to the phase comparator circuit 38 to operate the flip-flop circuit 51 as mentioned in the description of FIG. 15. Outputs of the first and second local oscillators 26*a* and 26*b* are supplied to the demodulators 24 and 25 through a switch circuit 62. The switch circuit 62 is operated by the output of the flip-flop circuit 51 in the same manner as the switch circuit 22 and extracts the outputs of the first and second local oscillators 26*a* and 26*b* alternately for every horizontal scanning period. The switch circuits 22 and 62 are operated synchronously, therefore the original chrominance signal extracted by the switch circuit 22 is demodulated with the reference subcarrier produced by the first local oscillator 26*a* whose phase is locked by the burst signal in the original chrominance signal, and the delayed chrominance signal extracted by the switch circuit 22 is demodulated with the reference subcarrier produced by the second local oscillator 26b whose phase is locked by the burst signal in the delayed chrominance signal. Other operations are the same as those of the example shown in FIG. 15.

Figure 17:
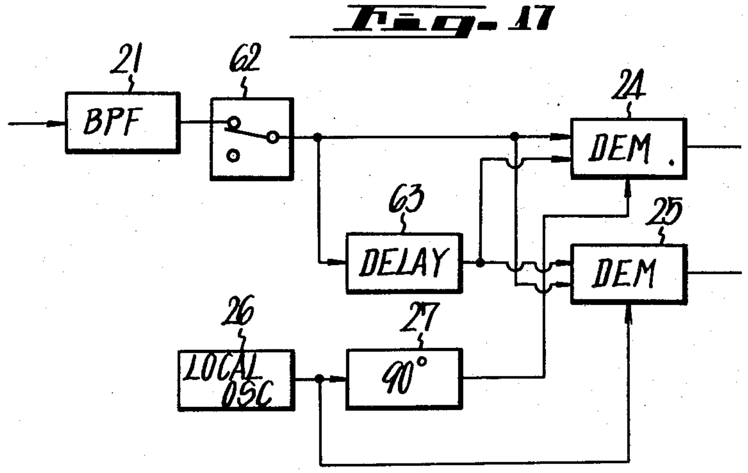
FIG. 17 is a block diagram showing a modified form of the principal part of the demodulator circuit of this invention.

Any of the foregoing examples employ the demodulation system of the construction depicted in FIG. 6 but it is also possible to adopt a demodulation system such as shown in FIG. 17. This system is exactly the same in principle as that of FIG. 6 except that the switching operation is carried out prior to the delay operation. That is, the chrominance signal is separated by the filter 21 from the composite color television signal and is applied to a switching circuit 62, by which a signal is extracted from the chrominance signal every other horizontal scanning line. The extracted signal is directly fed to the demodulators 24 and 25, while at the same time, it is applied to a delay circuit 63 to be delayed by one horizontal scanning period and then supplied to the demodulators 24 and 25 respectively. The supply of the reference subcarrier signal to the demodulators 24 and 25 for demodulation is exactly the same as in the case of FIG. 6.

Consequently, for example, the signals $F_n$, $F_{n+2}$, . . . . of the odd-number horizontal scanning lines are sequentially derived from the switching circuit 62 and the demodulators 24 and 25 are sequentially supplied with the signals in the order of $F_n$, $F_n$, $F_{n+2}$, $F_{n+2}$, .... based on the extracted signal and the signal delayed behind it by one horizontal scanning period, thus providing exactly the same demodulated output as that obtainable with the system of FIG. 6. This is the same as the alternate extraction of the original chrominance signal separated by the filter and the signal delayed behind the original chrominance signal by one horizontal scanning period. It will be seen that in the case of employing the construction of FIG. 17, the switching circuit 62 may be controlled by the same method as above described.

The demodulation system of this invention described in the foregoing does not involve the adding operation and reversal of the demodulating axis as in the standard PAL system, and hence is extremely simplified in construction as compared with the standard PAL system. Further, the system of this invention is free from the venetian blinds which are encountered in the simple PAL system. Namely, in the demodulation system of this invention the demodulating axis for the one color difference signal is not reversed at every horizontal scanning, so that even if a phase distortion is caused in the color signal, it does not ever appear as a phase distortion in the opposite direction between adjacent horizontal scanning lines as depicted in FIG. 5B. That is, although the phase of the modulating axis of the color subcarrier component modulated by the one color difference signal is reversed to $\gamma$ and $-\gamma$ alternately at every horizontal scanning, only the chrominance signal having the phase of the modulating axis of the color subcarrier component for the one color difference signal is $\gamma_0$ is demodulated. Therefore, the phase distortion between adjacent horizontal scanning lines appears in the same direction at all times. Accordingly, no difference in saturation is caused between adjacent horizontal scanning lines of the same signal and, in addition, even if the phase distortion is produced between adjacent horizontal scanning lines of different signals as indicated by an arrow in FIG. 7E, the difference in saturation therebetween is negligibly small and the venetian blinds do not occur. Further, in the present invention the phase of the burst signal contained in the original chrominance signal is detected and by the use of this detected output the alternate extracting operation of the signal supplied to the demodulators is controlled, so that a signal having a predetermined modulating axis is always picked up to thereby ensure the provision of predetermined demodulated color signals. In addition, in the example of the present invention as shown in FIG. 16 using independent local oscillators for the original and delayed chrominance signals extracted every other horizontal scanning line, a slight lag in the delay time of the delay circuit 23 or 63 is not critical. Namely, in the system of FIG. 16 the delay time is not required to be accurate as in the standard PAL system. In the standard PAL system the limit range in the error of the delay time is 0.01 percent, while in this invention the limit range is 0.1 percent. Further, in the system of the present invention the demodulating axes for the respective color signals are constant, so that hue adjustment is also possible.

Although the present invention has been described in connection with the case where the separated original chrominance signal and the signal delayed behind it by one horizontal scanning period are alternately extracted, it will be understood that the original chrominance signal and a signal delayed behind it an odd-number of times can be used as long as one horizontal scanning period may be alternately picked up.

In the foregoing examples the signal of the odd-number horizontal scanning line of the transmitted signal is picked up but the signal of the even-number horizontal scanning line may be extracted and the signals of the odd- and even-number horixontal scanning lines may be alternately extracted every other field.

It is needless to say that the present invention can be employed in the case where the two color signals are I and Q signals and will be easily understood that the color television signal in accordance with the NTSC system can be received and demodulated.

It will be apparent that many modifications and variations may be effected without departing from the scope of the novel concepts of this invention.

What is claimed is:

1. A color television receiver adapted to receive the chrominance and luminance components of color television signals comprising first and second chrominance signal components amplitude modulated on a common subcarrier and having quadrature phase modulation axes, said receiver comprising circuit means for passing both of said receiver chrominance components only during selected intervals; delay means for delaying at least certain undelayed ones of said chrominance components to produce delayed replicas thereof; demodulating means; means for combining selected ones of said undelayed chrominance components and delayed replicas of said selected chrominance components to produce a video signal identical in duration to said transmitted signals, said means for combining being connected to said demodulating means to supply said video signal thereto; and means to supply said demodulating means a reference subcarrier having a fixed phase.

2. A color television receiver adapted to receive and display the luminance and chrominance components of color television signals comprising first and second chrominance signal components amplitude modulated on a common subcarrier and having quadrature phase modulation axes, said receiver comprising delay means for delaying said chrominance components to produce delayed replicas of said received chrominance components; circuit means for passing alternate intervals of said received chrominance components and of said delayed replicas of said selected chrominance components to produce a video signal identical in duration to said transmitted signals; demodulating means connected to said switching means to receive said video signal; and means to supply to said demodulating means a reference carrier having a fixed phase to cause said demodulating means to produce a continuous signal corresponding to said first chrominance component.

3. A color television receiver adapted to receive and display the luminance and chrominance components of color television signals comprising first and second chrominance signal components amplitude modulated on a common subcarrier and having quadrature phase modulation axes, said receiver comprising circuit means for passing a portion comprising less than all of said received chrominance components; delay means for delaying said received chrominance components to produce delayed replica thereof; means for combining said portion of said received chrominance components passed by said circuit means and the delayed replica of said portion to produce a video signal identical in duration to said transmitted signals; demodulating means connected to said combining means to receive said video signal therefrom; and means to supply to said demodulating means reference subcarriers having fixed phases to demodulate from said video signal first and second continuous signal corresponding, respectively, to said first and second chrominance components.

4. A color television receiver adapted to receive and display the luminance and chrominance components of color television signals comprising first and second chrominance signal components amplitude modulated on a common subcarrier and having quadrature phase modulation axes, said receiver comprising circuit means for passing a portion comprising less than all of said received chrominance components; delay means connected to the output of said circuit means for delaying said portion of said chrominance components passed by said circuit means to produce a delayed replica of said portion of the undelayed chrominance components; demodulating means connected to said circuit means to said delay means to apply to said demodulating means said portion of said chrominance components passed by said circuit means and said delayed replica to produce a video signal identical in duration to said transmitted signals; and means to supply to said demodulating means reference subcarriers having fixed phases to demodulate from said video signal first and second continuous signals corresponding, respectively, to said first and second chrominance components.

5. A color television receiver adapted to receive and display the luminance and chrominance components of color television signals comprising first and second chrominance signal components amplitude modulated on a common subcarrier and having quadrature phase modulation axes, said receiver comprising circuit means for passing a portion comprising less than all of said received chrominance components as a series of intermittent signals, each interval during which said chrominance components are passed being equal to each interval between successive passed chrominance components; delay means to delay for one said interval at least said portion of said chrominance components passed by said circuit means to produce a delayed replica of at least said portion of said chrominance components; demodulating means connected to said circuit means to receive therefrom a continuous video signal corresponding to said portion of said chrominance components and said delayed replica of said portion; and means to supply to said demodulating means a reference subcarrier having a fixed phase.

6. A color television receiver as defined in claim 5 wherein said circuit means is a switch.

7. A color television receiver adapted to receive and display the luminance and chrominance components of transmitted color television signals comprising first and second chrominance signal components amplitude modulated on a common subcarrier and having quadrature phase modulation axes, said receiver comprising switching means for passing a portion comprising only alternate line intervals of the chrominance components; delay means for delaying said portion of said chrominance components passed by said switching means for substantially one line interval to produce a delayed replica of said portion; means for combining said portion of said chrominance components with said delayed replica thereof to produce a continuous video signal; demodulating means connected to said combining means to receive said continuous video signal; and means to supply first and second reference subcarriers having fixed phases to said demodulating means to produce first and second continuous demodulated signals corresponding to said first and second chrominance components, respectively.

8. A color television receiver adapted to receive the chrominance and luminance components of color television signals comprising first and second chrominance signal components amplitude modulated on a common subcarrier and having quadrature phase modulation axes, said receiver comprising filter means to remove said luminance component from said chrominance components; switching means having first contact means connected to the output of said filter means and having second contact means; delay means interconnected between said filter means and said second contact means to produce delayed replicas of said chrominance components; control means to derive the output of said switching means alternately from said first contact means and said second contact means every line period whereby during one line period said chrominance components are simultaneously passed by switching means and delayed by said delay line and during the next line period the chrominance components from said delay line are substituted for chrominance components received during the eliminated line period; first and second demodulating means connected in parallel to said output of said switching means to receive from said switching means a continuous video signal comprising said chrominance components passed by said switching means and said delayed replicas of said passed chrominance components; and means to supply to said first and second demodulating means first and second reference subcarriers having fixed phases to cause said demodulating means to produce first and second continuous signals corresponding, respectively, to said first and second chrominance components.

9. A color television receiver as defined in claim 8 wherein said delay means delays said chrominance signal for substantially one line period.

10. A color television receiver as defined in claim 7 wherein said control means is activated in response to a signal having a repetition rate equal to the line scanning rate.

11. A color television receiver as defined in claim 10 wherein said means to supply reference subcarriers comprises an oscillator connected to said first and second demodulating means.

12. A color television receiver as defined in claim 10 wherein the frequency of said oscillator is substantially the same as the burst frequency of said television signals.

13. A color television receiver as defined in claim 12 further including phase shift means interconnected between said oscillator and said first demodulating means.

14. A color television receiver as defined in claim 13 wherein said phase shift means shifts the phase of the output of said oscillator by 90 degrees.

15. A color television receiver as defined in claim 14 comprising, in addition, matrix means, the output from said demodulating means and said luminance component being supplied to said matrix means for deriving the primary color components of said television signals.

16. In a color television receiver adapted to receive and display the chrominance and luminance components of a color television signal transmitted in accordance with a phase alternation by line system, a decoding circuit comprising switching means for passing less than all of said received chrominance components; delay means for delaying undelayed ones of said chrominance components to produce delayed replicas of said chrominance components; demodulating means; means for combining selected ones of said undelayed chrominance components and delayed replicas of said selected chrominance components to produce a continuous video signal, said last-named means being connected to said demodulating means to supply said continuous video signal thereto; and means to supply to said demodulating means a reference subcarrier having a fixed phase.

17. In a color television receiver adapted to receive and display the chrominance and luminance components of a color television signal transmitted in accordance with a phase alternation by line system in which only the line periods of the video signal having a color burst signal in the same quadrant are utilized, said receiver comprising circuit means for receiving and demodulating a portion comprising less than all of said received chrominance components, delay means for delaying said chrominance components to produce a delayed replica thereof, and means for utilizing said portion of said chrominance components and said delayed replica corresponding to said portion to produce a video signal identical in duration to said transmitted signals.

18. A color television receiver adapted to receive the chrominance, luminance, and burst components of color television signals in which the first and second chrominance signal components are amplitude modulated on a common subcarrier and have quadrature phase modulation axes, said receiver comprising filter means to receive said television signals and to transmit said chrominance components; delay means connected to the output of said filter means to form delayed replicas of said chrominance and burst components; switch means having first contact means connected to the output of said filter means and second contact means connected to the output of said delay means; first and second local oscillators; first control means connected to said output of said filter means to control said first local oscillator; second control means connected to said output of said delay means to control said second local oscillator; pulse means actuated by said television signals to govern said first and second control means; second switch means having first contact means connected to the output of said first oscillator and second contact means connected to the output of said second oscillator; and common means connected to said first control means and to said first oscillator to be governed thereby and connected to said first and second switch means to actuate both of said switch means simultaneously.

19. A color television receiver of claim 18 in which said first control means comprises a first burst gate circuit, said second control means comprises a second burst gate circuit, said pulse means is connected to both of said burst gate circuits of open said gates at the proper time to let burst components to said television signals pass through.

20. The color television receiver of claim 18 in which the phase of oscillations of said first oscillator is locked to the phase of said burst components of the original chrominance signal, and the phase of oscillations of said second oscillator is locked to the phase of said delayed replicas of said burst components in said delay signal.

21. The television receiver of claim 20 in which said delay is equal to one line of said television signal and both said switch means are actuated every line period.

22. The color television receiver of claim 21 comprising in addition, first and second demodulators connected to the output of said first switch means to receive, alternately, one line of said chrominance components in a first line interval and the same line of said chrominance components in a second line interval, means connecting the output of said second switch means to said first demodulator, and separate means connecting the output of said second switch means to said second demodulator.

* * * * *

UNITED STATES PATENT OFFICE
CERTIFICATE OF CORRECTION

Patent No. 3,699,240 Dated October 17, 1972

Inventor(s) Minoru Morio and Hiroyuki Kimura

It is certified that error appears in the above-identified patent and that said Letters Patent are hereby corrected as shown below:

IN THE SPECIFICATION

Column 1, the line marked 51, change "though" to --thought--

Column 2, the line marked 42, change "NSTC" to --NTSC--

Column 3, the line marked 38, change "$\varphi_{-0}$" to -- $-\varphi_0$-- the line marked 4, change "of" to --for--

Column 4, the line marked 12, change "$L_{n-1}$" to --$L_{n+1}$-- the line marked 22, change "$(E_B' - E_Y')n+1$" to --$(E_B' - E_Y')_{n+1}$-- also in the line marked 22, change "$j(E_R' - E_Y')_{n-1}$ to --$j(E_R' - E_Y')_{n+1}$-- the line marked 25, change "$L_{n-2}$" to --$L_{n+2}$--

Column 5, the line marked 8 and 9, change "$\frac{F\alpha + F\alpha}{2}$ "

UNITED STATES PATENT OFFICE

CERTIFICATE OF CORRECTION

Patent No. 3,699,240 Dated October 17, 1972

Inventor(s) Minoru Morio and Hiroyuki Kimura

It is certified that error appears in the above-identified patent and that said Letters Patent are hereby corrected as shown below:

to --$\frac{F_{\alpha} + F_{-\alpha}}{2}$--

Column 6, the line marked 64, change "$L_{n-1}$" to --$L_{n+1}$--

Column 7, the line marked 19, change "$\varphi_0$ and $\varphi_0$" to --$\varphi_0$ and $-\varphi_0$--

Column 9, the line marked 32, after "its" insert --positive--

Column 12, the line marked 64, change "$\gamma$ and $-\gamma$" to --$\varphi_0$ and $-\varphi_0$--

Column 13, the line marked 1, change "$\gamma_0$" to --$\varphi_0$--

Signed and sealed this 12th day of November 1974.

(SEAL)
Attest:

McCOY M. GIBSON JR.
Attesting Officer

C. MARSHALL DANN
Commissioner of Patents